(12) United States Patent
Mandalia et al.

(10) Patent No.: US 8,706,501 B2
(45) Date of Patent: Apr. 22, 2014

(54) METHOD AND SYSTEM FOR SHARING SPEECH PROCESSING RESOURCES OVER A COMMUNICATION NETWORK

(75) Inventors: Baiju D. Mandalia, Boca Raton, FL (US); Pradeep P. Mansey, Coral Springs, FL (US)

(73) Assignee: Nuance Communications, Inc., Burlington, MA (US)

( * ) Notice: Subject to any disclaimer, the term of this patent is extended or adjusted under 35 U.S.C. 154(b) by 774 days.

(21) Appl. No.: 11/007,985

(22) Filed: Dec. 9, 2004

(65) Prior Publication Data

US 2006/0129406 A1     Jun. 15, 2006

(51) Int. Cl.
| | | |
|---|---|---|
| *G10L 15/00* | (2013.01) | |
| *G10L 25/00* | (2013.01) | |
| *H04M 7/00* | (2006.01) | |
| *H04L 12/58* | (2006.01) | |
| *H04W 36/00* | (2009.01) | |
| *H04W 40/00* | (2009.01) | |

(52) U.S. Cl.
USPC ........ 704/270.1; 704/231; 704/270; 704/275; 455/412.1; 455/436; 455/445; 455/455; 379/219; 379/221.01; 709/201; 709/203; 709/217; 709/219

(58) Field of Classification Search
CPC ....... G10L 15/30; G10L 13/00; G10L 13/047; G10L 15/22; G10L 15/265; H04L 9/3215; H04L 12/1813; H04L 12/2493; H04L 29/06; H04L 29/0647; H04L 29/06095; H04L 65/1003; H04L 65/1063; H04L 65/60; H04M 4/487; H04M 4/493; H04M 4/4936; H04M 4/4938; H04M 7/0072; H04M 7/0066
USPC ............ 704/270.1; 455/412.1, 436, 445, 455; 379/219, 221.01; 709/201, 203, 217, 709/219
See application file for complete search history.

(56) References Cited

U.S. PATENT DOCUMENTS 5,809,472 A * 9/1998 Morrison ...................... 704/500
6,154,445 A 11/2000 Farris et al.
(Continued)

FOREIGN PATENT DOCUMENTS

WO    WO 0021075 A1 * 4/2000

OTHER PUBLICATIONS

Imieliński, T. and Navas, J. C. 1999. GPS-based geographic addressing, routing, and resource discovery. Commun. ACM 42, 4 (Apr. 1999), 86-92. DOI=http://doi.acm.org/10.1145/299157.299176.*

(Continued)

*Primary Examiner* — Paras D Shah
(74) *Attorney, Agent, or Firm* — Wolf, Greenfield & Sacks, P.C.

(57) ABSTRACT

A method and system (40) for sharing speech processing resources (54) over a (communication network (21) for handling multiple client types (100, 101, etc.) and multiple media protocol types. The system can include a router (400) coupled to the communication network, a speech response system (500) coupled to the router, and a server (600) coupled to the speech response system and the router. The server can include at least one processor programmed to determine a media protocol and a client type of a client used for speech communication with the server, adapt at least one among encoding or decoding for the speech communication based on the media protocol and the client type, and dynamically and adaptively configure of the speech processing resources based on the media protocol and the client type.

35 Claims, 5 Drawing Sheets

(56) References Cited

U.S. PATENT DOCUMENTS

| | | | |
|---|---|---|---|
| 6,505,161 B1* | 1/2003 | Brems | 704/270 |
| 6,543,052 B1 | 4/2003 | Ogasawara | |
| 6,556,676 B1 | 4/2003 | Buchanan et al. | |
| 6,738,743 B2* | 5/2004 | Sharma et al. | 704/270.1 |
| 6,801,604 B2* | 10/2004 | Maes et al. | 379/88.17 |
| 6,865,536 B2* | 3/2005 | Jochumson | 704/270.1 |
| 6,937,977 B2* | 8/2005 | Gerson | 704/201 |
| 7,003,463 B1* | 2/2006 | Maes et al. | 704/270.1 |
| 7,020,263 B2* | 3/2006 | Bauer et al. | 379/219 |
| 7,076,428 B2* | 7/2006 | Anastasakos et al. | 704/270.1 |
| 7,127,390 B1* | 10/2006 | Su | 704/221 |
| 7,203,645 B2* | 4/2007 | Pokhariyal et al. | 704/251 |
| 7,203,646 B2* | 4/2007 | Bennett | 704/257 |
| 7,302,390 B2* | 11/2007 | Yang et al. | 704/246 |
| 7,552,225 B2* | 6/2009 | Creamer et al. | 709/230 |
| 7,710,946 B2* | 5/2010 | Kusnitz et al. | 370/352 |
| 2002/0091528 A1* | 7/2002 | Daragosh et al. | 704/270.1 |
| 2002/0184373 A1* | 12/2002 | Maes | 709/228 |
| 2003/0088421 A1* | 5/2003 | Maes et al. | 704/270.1 |
| 2003/0109248 A1* | 6/2003 | Lewis | 455/412 |
| 2003/0165227 A1* | 9/2003 | De Beer | 379/221.01 |
| 2003/0182113 A1* | 9/2003 | Huang | 704/231 |
| 2004/0117179 A1* | 6/2004 | Balasuriya | 704/231 |
| 2005/0021826 A1* | 1/2005 | Kumar | 709/232 |
| 2005/0096016 A1* | 5/2005 | Tervo et al. | 455/414.1 |
| 2005/0198328 A1* | 9/2005 | Lee et al. | 709/229 |
| 2006/0041431 A1* | 2/2006 | Maes | 704/270.1 |

OTHER PUBLICATIONS

Dan Chazan, Ron Hoory, Gilad Cohen, and Meir Zibulski, "Low bit rate speech compression for playback in speech recognition systems," in European Signal Processing Conference (EUSIPCO), 2000. http://citeseer.ist.psu.edu/chazan00low.html.*

Cohen, G. REcognition COmpatible Voice Compression (RECOVC). IBM Research. http://www.haifa.il.ibm.com/projects/multimedia/recovc/index.html. Jan. 2002.*

Reynolds, F. et al. "Composite Capability/Preference Profiles (CC/PP): A user side framework for content negotiation." W3C. pp. 1-13. Jul. 27, 1999, http://www.w3.org/TR/NOTE-CCPP/.*

"Application Programming Interface for Speech Recognition System", IBM Technical Disclosure Bulletin, vol. 36, No. 06B, pp. 11-12, (Jun. 1993).

* cited by examiner

METHOD AND SYSTEM FOR SHARING SPEECH PROCESSING RESOURCES OVER A COMMUNICATION NETWORK

BACKGROUND OF THE INVENTION

1. Technical Field

This invention relates to the field of communications, and more particularly to a method and system for sharing speech resources at a server.

2. Description of the Related Art

Automatic Speech Recognition (ASR) and Text to Speech (TTS) capabilities are being deployed in various computing applications. These capabilities are implemented utilizing different technologies that include, but are not limited to, desktop command and control, desktop dictation, command and control in noisy conditions, Telephony command and control, handheld device command and control, and wireless information services. As processing power to handle speech becomes affordable relative to return of investment and as speech technologies continue to grow, the number and variety of speech processing resources will also continue to grow.

Today's communications environment, however, is ill equipped to handle this growth. More specifically, no single existing server handles voice recognition and speech generation functions centrally and remotely for various kinds of media types. Different media types exist for telephony and data networks, each utilizing some form of digitized and encoded voice. Some systems process voice using packet-based standards like Voice over Internet Protocol (VoIP) standards (e.g., H.323/SIP standards), while others use circuit-based standards. Some systems stream voice in real time, others package voice within files of file segments that do not have real time processing requirements. The different media types are also formatted according to a vast array of largely incompatible media formats, each tailored for a particular presentation device.

Using conventional communications environments, multiple systems having overlapping functionality are needed to handle different media types and speech processing tasks. Since voice processing systems are typically expensive in terms of memory utilization, CPU requirements, and software, the cost of these multiple systems can impede the growth and availability of speech processing resources. What is needed is a method and a system to cost effectively provide speech processing resources for various media types without requiring several expensive and functionally redundant systems.

SUMMARY OF THE INVENTION

Embodiments in accordance with the invention can enable a method and system where the same voice recognition engine resources on a server can process speech which comes either over telephone or IP network and also in various formats including pre-processed speech. Such a system can share the server recognition resources when calls are received from different client types.

In this regard, a first aspect of the invention involves a method of sharing speech processing resources at a server including the steps of determining a media protocol and a client type of a client used for speech communication with the server, adapting at least one among encoding and decoding for the speech communication based on the media protocol and the client type, and dynamically and adaptively configuring of the speech processing resources based on the media protocol and the client type. Adapting can be done based on speech quality requirements and configuring can be done by configuring the media protocol's application programming interfaces based on device type and application complexity. The determining step can be done by receiving and decoding a header having at least two among the client type, the media protocol type, an application type, and a language type. The processing step can involve processing the header and determining availability of speech processing resources at the server and the configuring step can involve assigning and configuring a speech engine.

In a second aspect of the invention, a system for sharing speech processing resources over a communication network for handling multiple client types and multiple media protocol types can include a router coupled to the communication network, a speech response system coupled to the router, and a server coupled to the speech response system and the router. The server can include at least one processor programmed to determine a media protocol and a client type of a client used for speech communication with the server, adapt at least one among encoding and decoding for the speech communication based on the media protocol and the client type, and dynamically and adaptively configure at least one of the speech processing resources based on the media protocol and the client type. The processor can be further programmed to adapt by adapting based on speech quality requirements and configure by configuring the media protocol's application programming interfaces based on device type and application complexity. The processor can be further programmed to determine by receiving and decoding a header having at least two among the client type, the media protocol type, an application type, and a language type. In this regard, the processor can be further programmed to process the header and determine availability of speech processing resources at the server and to configure by assigning and configuring a speech engine.

In a third aspect of the invention, a computer program has a plurality of code sections executable by a machine for causing the machine to perform certain steps as described in the method and systems outlined in the first and second aspects above.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

Embodiments in accordance with the invention can share speech resources on demand or adaptively or dynamically over multiple transport mediums using different clients. Whether a client is an analog PSTN based system or a digital IP based voice system, embodiments herein can serve as intermediate middleware performing the resolution of the end points and media types based on the underlying protocol used. Speech resources can consider language type, vocabulary size, vocabulary type and background noise conditions during speech recognition for example and can further consider language type, vocabulary size, and speaker type during text to speech synthesis as examples in making appropriate routing decisions and selecting or configuring speech engines and servers.

Figure 1:
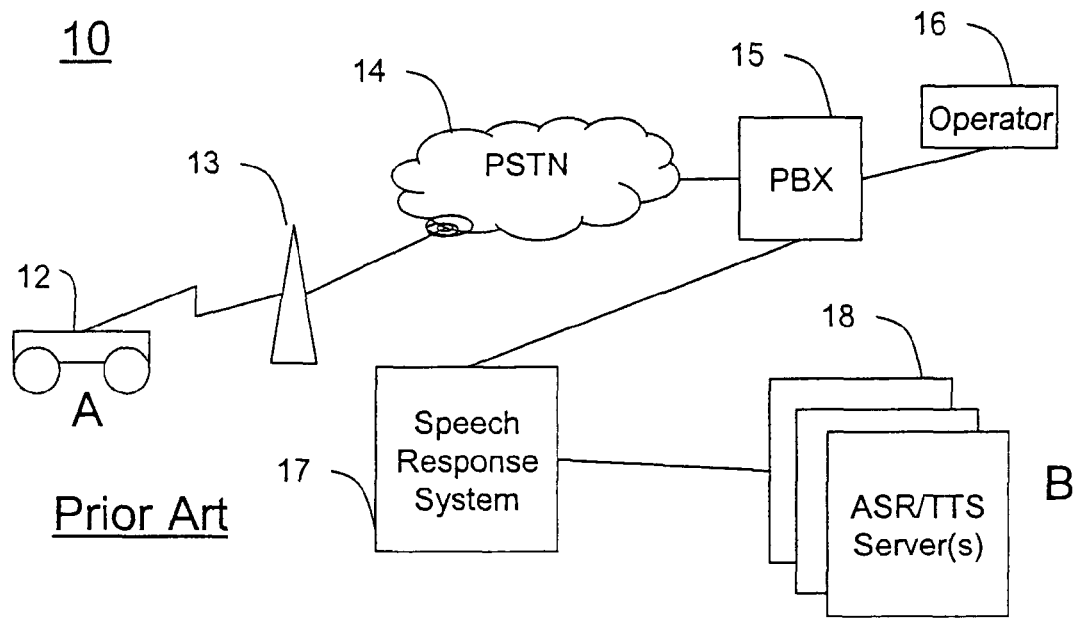
FIG. 1 is a block diagram of an existing communication system using a server having automatic speech recognition and text to speech synthesis (ASR/TTS) capabilities.

In the implementation of many speech applications there is typically an audio interface with a microphone and a speaker on one side and a speech processing resource on the other side. As shown in FIG. 1, an existing communication system 10 illustrates a telephone caller 12 calling from point A, over a Public Switched Telephone Network (PSTN) 14 via a base station 13 that gets connected to servers 18 at point B via a PBX 15, a speech response system 17 and an optional operator 16 for information services or call center automation. Many servers are deployed at point B based on demand. The format of the voice signal sent from the speech response system 17 to the ASR/TTS servers 18 in this system uses a specific packetization protocol and audio compression format. Since the endpoint in this is a telephone hand set (12), the compression level is in the form of audio that accommodates a 4 kHz bandwidth of the PSTN 14. Such signals are mostly 8 kHz ulaw or alaw 8 bit signals.

Speech response system 17 can be any system capable of functioning as a speech-enabled interface between users and computer systems or software applications. Accordingly, the speech response system 17 can support speech recognition technologies that can replace telephone keypad input or Dual Tone Multi-Frequency (DTFM) input, which are typical input provided to many Interactive Voice Response (IVR) systems, with more natural voice responses. In one embodiment, the speech response system 17 can enable the execution of voice call processing and telephony channel handling using standards based technologies like VoiceXML or Call Control XML (CCXML). For example, the speech response system 17 can include the IBM WebSphere Voice Response from International Business Machines Corporation (IBM) of Armonk, N.Y. or any other such telephony solution that makes it possible to enable speech-based, self-service access to data and processes provided by one or more networked applications over a voice-based communication channel.

Figure 2:
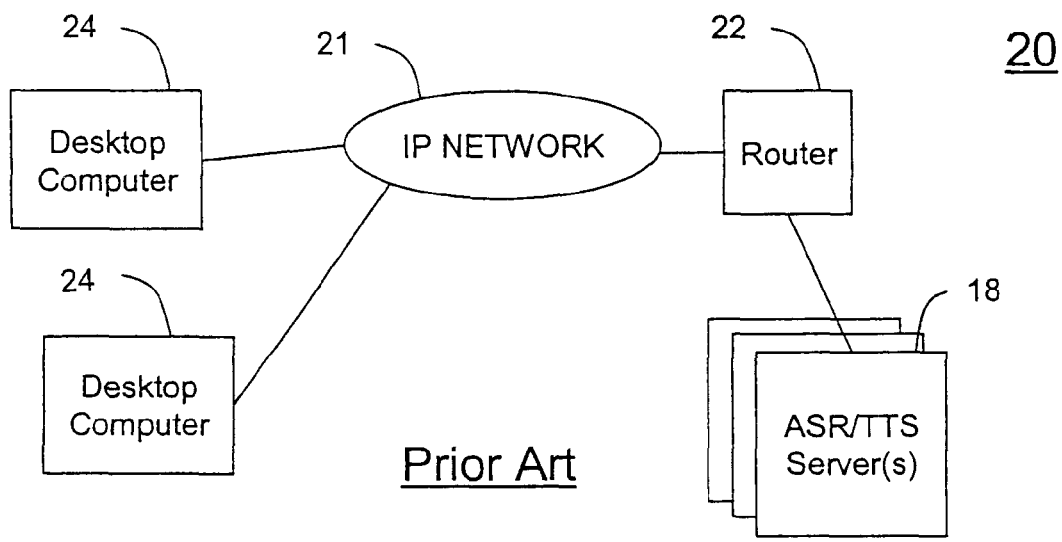
FIG. 2 is another block diagram of an existing communication system using a server having ASR/TTS capabilities over an IP network.

Referring to FIG. 2, another existing communication system 20 illustrates another variation where desktop devices 24 connect over a local area network or IP Network 21 via a router 22 to a dictation server 18 that is serving multiple dictation clients. The ASR/TTS server 18 in this scenario receives a high quality microphone based input and again uses a packetization protocol optimized for this network condition and audio format. The signal quality in this case can be either 44 kHz or 22 kHz or 11 kHz 16 bit signed audio.

Figure 3:
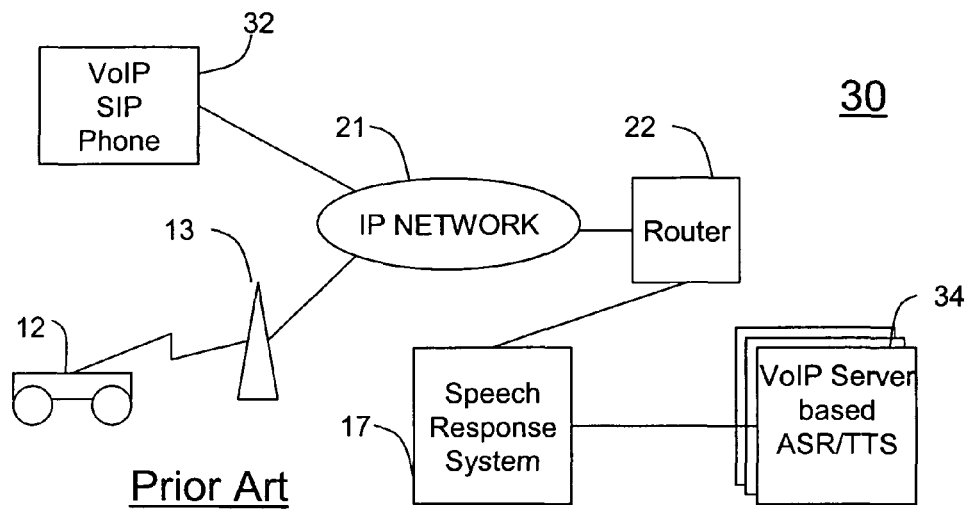
FIG. 3 is another block diagram of an existing communication system using a Voice over IP server having ASR/TTS capabilities over an IP network.

Referring to FIG. 3, in addition to a caller 12 communicating via a base station 13 and via an IP Network 21, there is a voice over IP phone 32 on a desktop connecting to a set of servers 34 for information services and call center automation applications in communication system 30. The voice over IP phone 32 can use the router 22 and speech response system 17 to communicate with the set of servers 34. It should be appreciated that in certain embodiments the speech response system 17 can be implemented in the manner previously detailed above in FIG. 1. For example, the speech response system 17 can include the IBM Websphere Voice Response for Advanced Interactive Executive (AIX). Voice over IP can also use a specific packetization and compression method to deliver the audio to the ASR/TTS server or servers 34. In each of the examples shown in FIGS. 1-3, the same service provider or user likely has three sets of resources serving very similar functionality but with duplication of software and hardware at a very high expense.

Figure 4:
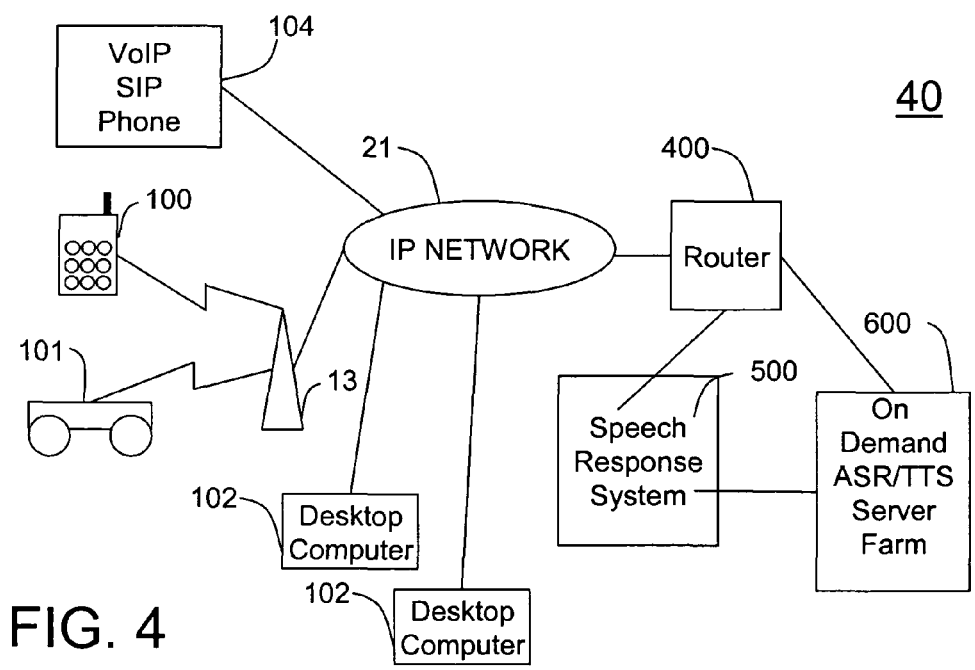
FIG. 4 is a block diagram of a communication system that shares speech processing resources at a server in accordance with an embodiment of the present invention.

Now with reference to FIG. 4, an embodiment in accordance with the present invention can utilize shared resources to handle all three scenarios illustrated in FIGS. 1-3. To achieve this, a server 600 in a communication system 40 can negotiate the different properties of the data being exchanged between the client side and the server side via an IP Network 21. Among the different properties being negotiated can include a simplified voice quality format (see further details below), a voice packetization format, a voice client type, and a voice capability service request (language, complexity). The clients (such as Voice over IP phone 32, digital handset 100, analog handset in telematics enabled vehicle 101, and desktop computers 102) can have access to a routing table (in a router 400 for example) with available resources and will route the requests to any specific server available in the geographic proximity either directly or via a speech response system 500. When a server 600 receives a request to allocate ASR or TTS resources, it adapts to the type of request received.

More specifically, the communication system 40 of FIG. 4 illustrates an on-demand or adaptive or dynamic ASR/TTS server farm 600 that can operate as a server for different kinds of clients. In one specific embodiment, the simplified voice quality format can be used to make the on demand ASR/TTS server farm 600 less complex in terms of network bandwidth usage and processing complexity. The simplified quality format can be limited to two forms, namely to G.711 for voice delivered via a PSTN call to the Speech Response System which is acceptable for the band-limited audio received from PSTN and cellular calls and to RecoVC—Pre-processed high quality audio from desktop or VoIP endpoints, which is an IBM proposed mechanism for distributed speech recognition where the compressed audio delivered to the speech recognition engine is in the format needed to immediately start the ASR process without any further decompression of the audio. While embodiments herein are not necessarily limited to use of the simplified quality format referenced above, such an embodiment can be ideally suited for personal digital assistants (PDAs), or Smart phones of the future using 3G networks or wireless 802.11b or g wireless LANs or Bluetooth.

Figure 5:
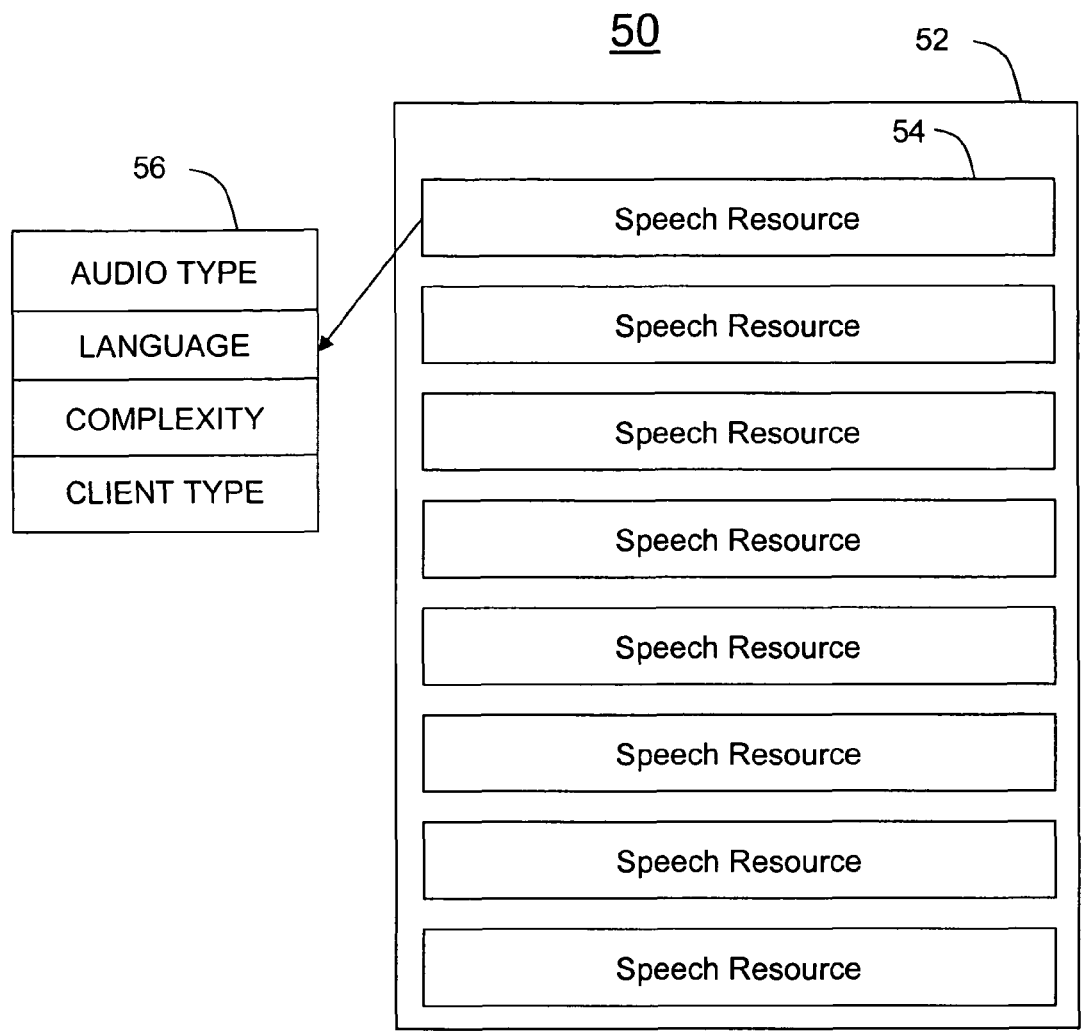
FIG. 5 is a block diagram of a server having a plurality of speech resources in accordance with an embodiment of the present invention.

Referring to FIG. 5, a communication system 50 can include a server 52 having a plurality of speech resources 54. As illustrated, each speech resource 54 can have an adaptive configuration 56. The server's speech resource 54 can negotiate the properties for each request. The server 52 can set the configuration and in turn can adapt to the processing needed. Among the properties in the adaptive configuration 56 that can be negotiated and set include audio type, language, complexity, and client type (among others). The audio type property can set the audio decoding logic for the speech resource 54. The language property can set the language requested by the client. The complexity property can allocate processing and memory for the resource 54 based on the complexity setting. And the client type property determines how results are delivered based on the client type. As the on-demand technology evolves, more and more properties can be associated in forming the adaptive configuration to make the servers as flexible as possible to appropriately handle various kinds of clients via server 600.

Each client (100, 101, etc.) in FIG. 4 can have a request builder that creates a header for a request for a resource or can have the router 400 build a header on its behalf. Thus, intelligent clients like a Voice over IP (VoIP) phone or a Personal Data Assistant (PDA) can build their own header, while for analog handsets such as the handset in vehicle 101, the router 400 is pre-programmed to build a header. The header can have or list the capabilities for the request.

Figure 6:
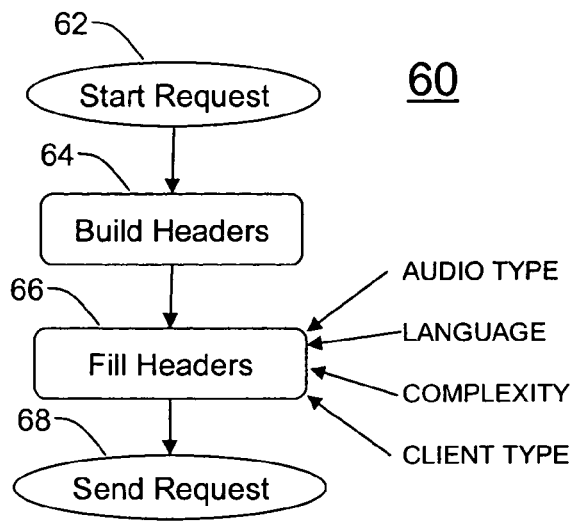
FIG. 6 is a flow chart illustrating a method of sharing speech resources by creating a header at a client for requesting a resource in accordance with an embodiment of the present invention.

Referring to FIG. 6, a flow chart illustrates a method 60 on how a client can build a request. The request is started at step 62 and the headers are built at step 64. Then the headers can be filled at step 66. The headers can be filled with the appropriate properties such as audio type, language, complexity, and client type. Once the headers are filled at step 66, the request can be sent at step 68.

Figure 7:
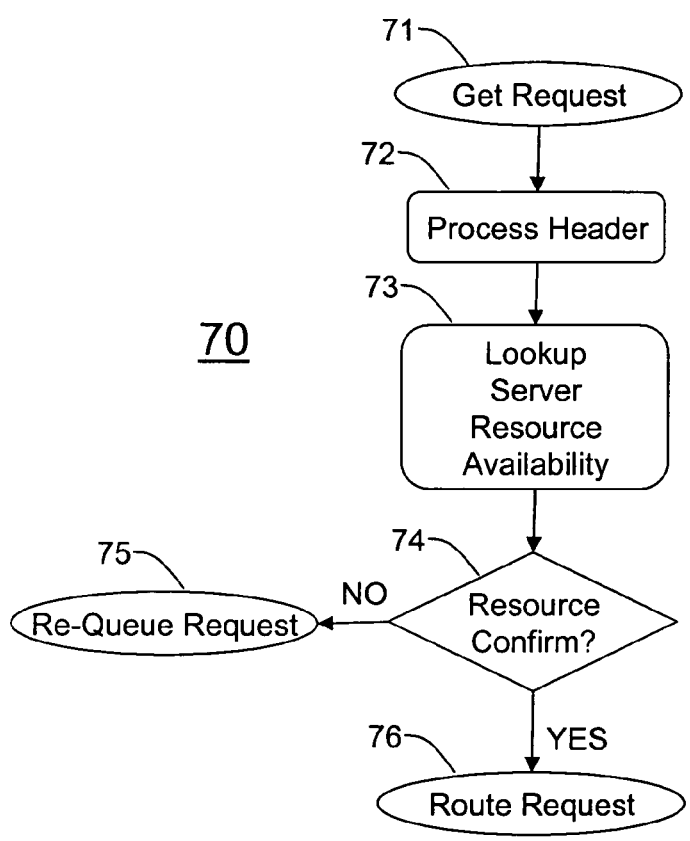
FIG. 7 is a flow chart illustrating a method of sharing speech resources by processing a header at a router in accordance with an embodiment of the present invention.

The request can be sent to the router 400 (FIG. 4). Referring to FIG. 7, another flow chart illustrates a method 70 of processing a request by the router 400 to get a resource on the speech server farm 600. The method 70 begins by getting the request at step 71 and processing the header at step 72. The availability (or suitability) of a specific resource at the server can be looked up during step 73. At decision block 74, if the resource appears to be available (or suitable), then the request is confirmed and routed to the appropriate resource on the server farm 600 at step 76. If the resource is unavailable (or unsuitable), then the request can be re-queued at step 75.

Figure 8:
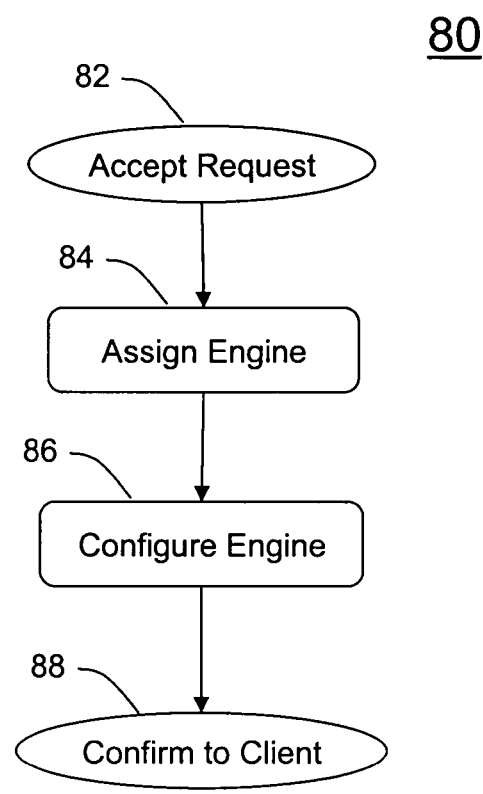
FIG. 8 is a flow chart illustrating a method of sharing speech resources by assigning and configuring a speech engine in accordance with an embodiment of the present invention.

Meanwhile, the server or server farm 600 can be allocated and configured in accordance with the request as shown by the flow chart of FIG. 8 illustrating method 80. The method 80 can begin by accepting the request at step 82 and assigning or allocating an appropriate speech engine at step 84 based upon the request. The speech engine can be further configured at step 86. Once the speech engine is assigned and configured, the method 80 can confirm the same to the requesting client at step 88. Note, embodiments herein can be applied in conjunction with the concept of grid computing to enable an on-demand distributed and scaleable utility to serve various kinds of speech clients.

It should be understood that the present invention can be realized in hardware, software, or a combination of hardware and software. The present invention can also be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for providing speech processing services comprising acts of:
   receiving, by a server comprising at least one processor, a speech processing request from one of a plurality of clients;
   identifying one media protocol type of the received speech processing request from among a plurality of media protocol types, wherein the plurality of media protocol types include a real-time protocol for data received over a public switched telephone network, a real-time protocol for high-quality dictation data received over a network, a real-time voice over internet protocol, and a non-real time protocol; and
   adapting, at least in part, a speech resource by setting decoding logic for the speech resource in accordance with the identified media protocol type identified in the speech processing request.

2. The method of claim 1, wherein identifying comprises identifying a complexity of the received speech processing request and adapting the resource comprises allocating processing resources and memory for the speech resource responsive to a level of complexity identified in the speech processing request.

3. The method of claim 1, wherein identifying comprises identifying a language of the speech processing request.

4. The method of claim 1, wherein the received speech processing request includes a header having at least two of a client type, the media-protocol type, an application type, and a language type.

5. The method of claim 1, further comprising processing the speech processing request with the adapted speech resource.

6. The method of claim 1, wherein adapting comprises setting a language property for the speech resource responsive to a language identified in the speech processing request.

7. The method of claim 1, wherein adapting comprises determining a format for speech processing results delivered from the speech resource in accordance with a client type identified in the speech processing request.

8. The method of claim 1, wherein adapting comprises configuring a media-protocol application programming interface of the resource in accordance with a client type identified in the speech processing request and an application complexity identified in the speech processing request.

9. The method of claim 1, further comprising negotiating, by the server, properties of the data exchanged between the one of the plurality clients and the server.

10. The method of claim 9, wherein the negotiating comprises specifying a simplified voice quality format comprising either a first form for voice data delivered via a public switched telephone network or a second form for high quality audio data.

11. The method of claim 9, wherein the negotiating comprises specifying a voice packetization format.

12. At least one non-transitory computer-readable storage medium comprising computer-readable instructions that when executed by at least one processor cause the at least one processor to execute acts of:
- receiving, by a server comprising at least one processor, a speech processing request from one of a plurality of clients;
- identifying one media protocol type of the received speech processing request from among a plurality of media protocol types, wherein the plurality of media protocol types include a real-time protocol for data received over a public switched telephone network, a real-time protocol for high-quality dictation data received over a network, a real-time voice over internet protocol, and a non-real time protocol; and
- adapting, at least in part, a speech resource by setting decoding logic for the speech resource in accordance with the identified media protocol type identified in the speech processing request.

13. The at least one non-transitory computer-readable storage medium of claim 12, wherein identifying comprises identifying a complexity of the received speech processing request and adapting the resource comprises allocating processing resources and memory for the speech resource responsive to a level of complexity identified in the speech processing request.

14. The at least one non-transitory computer-readable storage medium of claim 12, wherein identifying comprises identifying a language of the speech processing request.

15. The at least one non-transitory computer-readable storage medium of claim 12, wherein the received speech processing request includes a header having at least two of a client type, the media-protocol type, an application type, and a language type.

16. The at least one non-transitory computer-readable storage medium of claim 12, further comprising computer-readable instructions that when executed by the at least one processor cause the at least one processor to process the speech processing request with the adapted speech resource.

17. The at least one non-transitory computer-readable storage medium of claim 12, wherein adapting comprises setting a language property for the speech resource responsive to a language identified in the speech processing request.

18. The at least one non-transitory computer-readable storage medium of claim 12, wherein adapting comprises determining a format for speech processing results delivered from the speech resource in accordance with a client type identified in the speech processing request.

19. The at least one non-transitory computer-readable storage medium of claim 12, wherein adapting further comprises configuring a media-protocol application programming interface of the resource in accordance with a client type identified in the speech processing request and an application complexity identified in the speech processing request.

20. The at least one non-transitory computer-readable storage medium of claim 12, further comprising instructions for causing the at least one processor to negotiate properties of the data exchanged between the one of the plurality clients and the at least one processor.

21. The at least one non-transitory computer-readable storage medium of claim 20, wherein the negotiating comprises specifying a simplified voice quality format comprising either a first form for voice data delivered via a public switched telephone network or a second form for high quality audio data.

22. The at least one non-transitory computer-readable storage medium of claim 20, wherein the negotiating comprises specifying a voice packetization format.

23. A system for providing speech processing comprising:
- a server comprising at least one processor, the server configured to receive speech processing requests from a plurality of clients, and upon receiving a speech processing request from one of the plurality of clients, to identify one media-protocol type of the received speech processing request from among a plurality of media protocol types, wherein the plurality of media protocol types include a real-time protocol for data received over a public switched telephone network, a real-time protocol for high-quality dictation data received over a network, a real-time voice over internet protocol, and a non-real time protocol; and
- a speech resource configured to be adapted, at least in part, by the server by setting decoding logic for the speech resource in accordance with the identified media protocol type identified in the speech processing request.

24. The system of claim 23, wherein the server is further configured to identify a complexity of the received speech processing request and allocate processing resources and memory for the speech resource responsive to a level of complexity identified in the speech processing request.

25. The system of claim 23, wherein the server is further configured to identify a language of the speech processing request.

26. The system of claim 23, wherein the speech processing request includes a header having at least two of a client type, the media-protocol type, an application type, and a language type.

27. The system of claim 23, wherein the server is further configured to process the speech processing request with the adapted speech resource.

28. The system of claim 23, wherein the server is further configured to set a language property for the speech resource responsive to a language identified in the speech processing request.

29. The system of claim 23, wherein the server is further configured to set a format for speech processing results delivered from the speech resource in accordance with a client type identified in the speech processing request.

30. The system of claim 23, wherein the server is further configured to configure a media-protocol application programming interface of the speech resource in accordance with a client type identified in the speech processing request and an application complexity identified in the speech processing request.

31. The system of claim 23, wherein the server is further configured to negotiate properties of the data exchanged between the one of the plurality of clients and the server.

32. The system of claim 31, wherein the negotiating comprises specifying a simplified voice quality format comprising either a first form for voice data delivered via a public switched telephone network or a second form for high quality audio data.

33. The system of claim 31, wherein the negotiating comprises specifying a voice packetization format.

34. The system of claim 23, further comprising a plurality of speech resources, wherein each of the plurality of speech resources is substantially similar to the speech resource and each of the plurality of speech resources is configured to be adapted by the server to be able to process the received speech processing request.

35. The system of claim 23, further comprising a router configured to select the server for processing a speech processing request based upon a geographic proximity of the server to the one of the plurality of clients.

* * * * *